March 11, 1969     K. IVERSEN     3,431,726

SERVOMOTOR

Filed June 28, 1967

United States Patent Office 3,431,726
Patented Mar. 11, 1969

3,431,726
SERVOMOTOR
Kristian Iversen, Sonderborg, Denmark, assignor to Danfoss A/S, Nordborg, Denmark, a company of Denmark
Filed June 28, 1967, Ser. No. 649,568
Claims priority, application Germany, July 2, 1966,
D 50,456
U.S. Cl. 60—23    6 Claims
Int. Cl. F03g 7/06; F15b 11/10, 13/044

ABSTRACT OF THE DISCLOSURE

A servomotor having a piston actuated by a pressure fluid and restored by a spring. An electrical control circuit controls application of the pressure fluid to the piston and is opened and closed by a switch operable under control of the piston or other switches. The switch controlled by the piston has a movable contact mounted on a pivoted lever rocked by the piston through a friction coupling effectively maintaining the piston at one selected position, of many possible positions, intermediate two possible ultimate terminal positions thereof.

---

Figure 1:
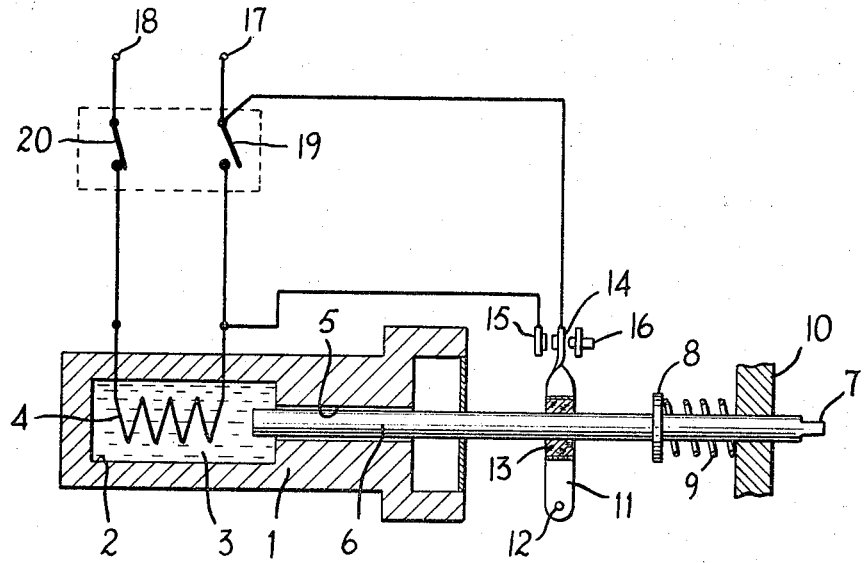

This invention relates generally to servo systems and more particularly to a new and improved servomotor.

Servomotors are known in which an electrically heated expanding and activating agent acts up on a piston in the motor and moves it in a given direction. The piston actuates a switch in a control circuit to which the electrical heating means is connected. In these motors the heating of the fluid agent causes expansion thereof and forces the piston to move in a given direction. The heating circuit is deenergized or interrupted by the switch controlled by the piston. As the heated, expanded, activating agent cools it contracts and the piston is restored to its original position, for example, by a spring. These motors are generally used to operate in only two possible positions defined by the position in which the piston finds itself when the expanding agent is in a cool condition and the other position is a terminal position defined by the heated expanding agent and the circuit terminal switch which is opened, generally by a cam on the piston, when the piston's terminal position is reached.

Pneumatic servomotors are known in which compressed air is supplied to a cylinder actuating the piston in a given direction and the return movement thereof is under control of a spring. The piston is restored when the supply of compressed air is interrupted and air pressure activating the piston pressure drops below a given level. The pressure drop may be a deliberate drop by opening of a blow-off orifice or due to leakage. In this type of motor the control devices may include resistance of throttles upstream and/or downstream of the piston chamber or cylinder thus insuring that the predetermined desired pressure prevails in the chamber. The exact desired positioning of the piston generally requires a very complex control arrangement.

It is a principal object of the present invention to provide a servomotor in which the piston thereof can be actuated to one of many possible positions intermediate two possible, ultimate terminal positions and held in this selected or desired position.

A feature of the servomotor in accordance with the invention is that energy is supplied to the actuating fluid medium to move the piston from one terminal position, in a given direction, toward and to a second terminal position. The extent of application of energy applied detemines the extent of pressure applied to the piston and therefore its terminal positions. The control members for determining the intermediate position do not participate in the piston movement toward the second terminal position.

As soon as the desired terminal position is reached the piston can be held in this position through a control circuit controlled by control means frictionally coupled to the piston which closes the control circuit which effectively controls the application of energy to the piston to maintain it in the desired position.

The servomotor system is constructed to apply pressure to the piston either through an expansible liquid heated by electrical means under control of the electrical control circuit or other separate controls shunted by the control circuit. The control circuit is provided with a switch having a movable contact mounted on a pivoted lever frictionally coupled to the piston for actuating in a closing direction if the piston begins to move in an opposite direction away from the desired initial position thereby electrically energizing the control circuit and energizing the heating means thereby to maintain the energy or pressure applied by the expansible fluid medium. Essentially the same type of control is carried out in a pneumatic or hydraulic servomotor embodying the invention in which the pressure fluid, which can be pneumatic fluid such as air or a hydraulic fluid, application is effected under control of a control circuit having a switch under control of the piston movement and having a similar movable contact frictionally coupled through a pivoted coupling lever to the piston.

The servomotor system is preferably provided either with switches or valve means whereby energy is applied to the fluid medium for moving the piston in one direction up to the desired position and the application of energy is interrupted by one of the switches or valves so the piston is allowed to move in the opposite direction under control of a spring tending to restore it. At this point the control circuit takes over under control of the piston movement and the piston is maintained in the desired position with only very minute or minor oscillations of the piston to maintain it in the set or desired position.

Figure 2:
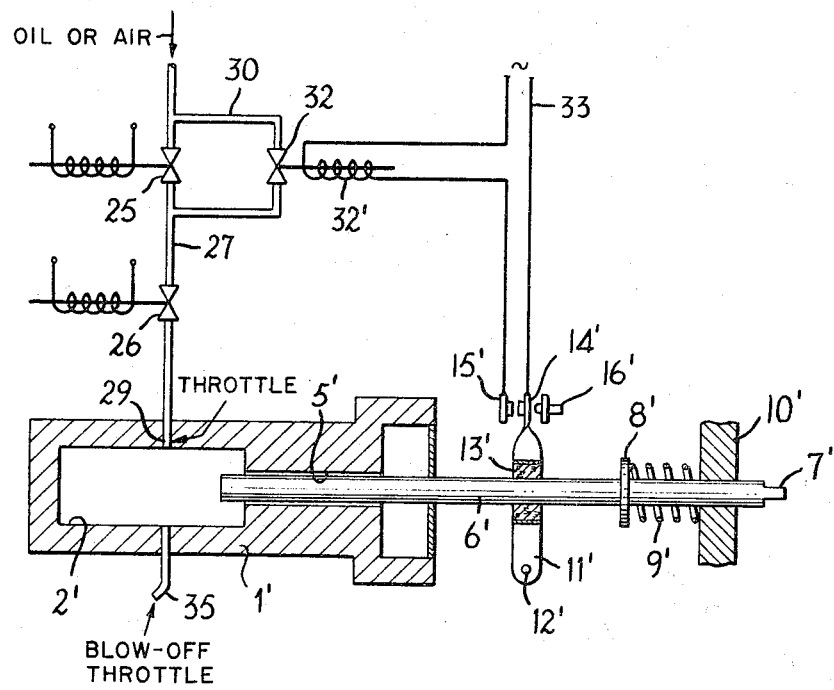

Other features and advantages of the servomotor in accordance with the present invention will be better understood as described in the following specification and appended claims, in conjunction with the following drawing in which:

FIG. 1 is a diagrammatic illustration, partly in section, of a servomotor in accordance with the invention; and FIG. 2 is a diagrammatic illustration, partly in section, of a second embodiment of a servomotor in accordance with the invention.

As illustrated in the drawing a motor housing 1 is provided with a cylinder or chamber 2 in which is contained a liquid 3 which will expand when heat is applied thereto. The fluid 3 is, for example, a micro-crystalline wax having a melting range in the order of 82 degrees to 85 degrees C. The liquid is heated by a heating coil 4 electrically energized as hereinafter explained.

The cylinder or chamber 2 communicates with a bore 5 in the housing 1 through which extends a piston or plunger 6 extending into the cylinder 2 and outwardly out of the housing with a free end 7 connected to a controlled element or apparatus, not shown, of any desired type which is to be controlled by the servomotor. A collar 8 is fixed on the piston and acts as an abutment for a spring 9 intermediate the collar and a stationary abutment or fixed wall 10 through which the piston extends and is axially guided thereon. The piston is actuated in the direction of the wall by the pressure developed by the expanding fluid and is restored by the spring 9 to its initial starting position as later explained herein.

In order to control the application of energy to the activating fluid to raise the pressure thereof, upon expansion of the fluid, control circuitry is provided including a lever 11 rockable on a pivot 12 and provided with a friction coupling 13 circumferentially of the piston or plunger 6. The coupling 13 should consist of a material selected so that the friction coefficient of the material, as far as possible, remains uneffected, for example, when oil is present. Cork has been found to be a good material for the friction coupling 13. The pivoted lever 11 carries on its free end a movable contact 14 movable between a stationary electrical contact 15 and a stationary stop 16. The heating coil is energized from an electrical source, not shown, connected at terminals 17, 18 and including a first control switch 19 in series with a second control switch 20. These two switches are shunted by the automatic control switch 14, 15 under automatic control of the piston movement as later explained.

It will be seen that when the switch 19 is closed the coil 4 is energized and heats the liquid 3 which will expand and force the piston 6 to the right against the force of the spring 9 and thereby compresses the spring 9. The extent of travel of the movement toward the right depends on the interval that the switch 19 is maintained closed. It being understood that this switch can be operated manually or by other control means, not shown. During the interval of movement of the piston or plunger 6 toward the right the rockable lever 11 is rocked toward the right and the contact 14 bears against the stationary stop 16 and remains there until the desired piston movement has been completed. When the first control switch 19 is opened the liquid 3 will cool and contract so that the pressure within the cylinder drops, consequently the piston 6 is urged in the opposite direction or toward the left by the spring 9. During this movement the friction coupling 13 rocks the lever 11 in the opposite direction, toward the left, and the movable contact 14 makes electrical contact with the stationary electrical contact 15 so that the open switch 19 is electrically shunted and the coil 4 is again electrically energized. Energy is therefore again applied to the activating liquid or fluid medium 3 and the piston moves to the right again until the switch 14, 15 opens. This is cyclically repeated so that the piston 16 substantially retains its desired position while executing only very low-amplitude oscillating movement in this desired position.

If a different position is desired for the piston the control switch 19 must again be closed until the desired position has been attained by the piston. In the new position the working cycle of the control switch 14, 15 is resumed as heretofore described. Conversely the second control switch may be opened to let the liquid 3 cool down to any desired extent so that the piston 6 may execute the desired movement toward the left and when the switch 20 is closed the cycle of the control switch 14, 15 is allowed to again take place. Thus the position of the piston can be selected and set at a multiplicity of positions and will be maintained by the control switch 14, 15.

It has been found that if the space or distance between the two stationary stops constituting the fixed stationary electrical contact 15 and stationary stop 16, is set at a few tenths of one millimeter the oscillation amplitude of the piston 6 is in the order of a few microns. The arm or lever 11 has its free end making a large movement for a very small movement of the piston axially toward the left. Thus the piston essentially or practically stands still in the desired or set position.

The embodiment heretofore described may be modified in many ways, for example, the lever 11 may be replaced by a collar, not shown, displaceable with friction on the piston 6 and disposed between the two fixed stops and capable of acting on the movable contact of a control switch arranged adjacent the travelling piston or plunger 6.

As indicated heretofore the servomotor can make use of a fluid medium in which energy is applied by applying pressure to the fluid which can be either oil or air so that the servomotor can be a hydraulic or a pneumatic servomotor. In order to simplify the drawing FIG. 2 illustrates an embodiment of a servomotor which can either be hydraulic or pneumatic and in which the primed reference numerals correspond to the parts heretofore described with respect to the embodiment in FIG. 1 and will operate in a similar mode.

In the embodiment illustrated in FIG. 2 an electromagnetic valve 25 in series with an electromagnetic valve 26 is provided in a supply line 27 for supplying the actuating fluid medium, oil or air, under pressure to a throttle 29 for applying fluid under pressure to a cylinder 2'. In this system the first valve 25 can be thought of as replacing the switch 19 and the second valve 26 as replacing the switch 20. A bypass fluid line 30 bypasses or shunts the first electromagnetic valve 25 and is provided with a third or control electromagnetic valve 32 having an activating coil 32' electrically energized by an electrical control circuit 33 having a control switch 14', 15' functioning as heretofore described. In this second embodiment it will be understood that when the electromagnetic valve 32 is in an open condition the control switch contacts 14', 15' are closed. When the contacts are open the electromagnetic valve is deenergized and is in a closed condition. The other two electromagnetic valves operate similarly and are closed when deenergized.

The two electromagnetic valves 25, 26 are operated in the same manner as the switches 19 and 20 respectively to cause the servomotor of the second embodiment to operate in the same manner as the first described embodiment of FIG. 1. A blow-off throttle 35 is provided to allow a certain pressure to be maintained in the chamber 2 when oil or air pressure is secured thereby to allow the piston to make or execute a controlled smooth return movement. The throttle 29 prevents pressure in the piston chamber from rising too high and too rapidly. The energizing coil 32' of the electromagnetic valve 32 can be considered as corresponding to the heating coil 4 of the first embodiment.

While preferred embodiments of the invention have been shown and described it will be understood that many modifications and changes can be made within the true spirit and scope of the invention.

What I claim and desire to be secured by Letters Patent is:

1. Servomotor comprising, a cylinder, a piston reciprocable in said cylinder, a fluid medium in said cylinder, controllable means to impart variable energy to said fluid medium to cause it to apply variable pressure to said piston and move it in a given direction in proportion to the pressure applied thereto, means to restore the piston in an opposite direction when said pressure applied thereto reduces below a given level, control means for controlling application of said energy to said fluid medium terminating imparting of said energy when said piston moves in said given direction a given extent and having means operably connected to said piston for initiating application of said energy substantially as said piston begins to travel in said opposite direction and terminating application of energy as said piston moves in said given direction thereby to maintain said piston positioned substantially in a position in which said fluid positions it initially by application of said pressure thereto, said control means for controlling said supply of energy comprising an electrical circuit, said means operably connected to said piston comprising a switch opening and closing said circuit and comprising a movable contact actuated by said piston, and friction coupling means operably connecting said movable contact to said piston.

2. A servomotor according to claim 1, in which said means to impart energy to said fluid medium comprises electrical means connected to said electrical circuit to heat said fluid medium, and in which said fluid medium comprises a liquid expandable with application of heat.

3. A servomotor according to claim 1, in which said means to impart energy to said fluid medium comprises a source of said fluid medium under pressure connected to controllably supply said fluid under pressure to said cylinder under control of said control means.

4. A servomotor according to claim 1, in which said friction coupling means comprises a pivoted lever, means mounting said movable contact on said lever, means mounting said friction coupling for movement with said piston for actuating said lever to an operative position in which said movable contact closes said switch and another operative position in which said movable contact opens said switch.

5. A servomotor according to claim 4, in which said means to impart energy to said fluid medium comprises a source of said fluid medium under pressure connected to controllably supply said fluid medium under pressure to said cylinder under control of said control means, said source of said fluid medium comprising valved connections electrically operated to opened and closed positions by said movable contact, and including other connections for supply of said fluid medium under pressure to said cylinder if desired when said switch is open.

6. Servomotor comprising, a cylinder, a piston reciprocable in said cylinder, a fluid medium in said cylinder, controllable means to impart variable energy to said fluid medium to cause it to apply variable pressure to said piston and move it in a given direction in proportion to the pressure applied thereto, means to restore the piston in an opposite direction when said pressure applied thereto reduces below a given level, control means for controlling application of said energy to said fluid medium terminating imparting of said energy when said piston moves in said given direction a given extent and having means operably connected to sail piston for initiating application of said energy substantially as said piston begins to travel in said opposite direction and terminating application of energy as said piston moves in said given direction thereby to maintain said piston positioned substantially in a position in which said fluid positions it initially by application of said pressure thereto, said control means for controlling said supply of energy comprising an electrical circuit, said means to impart energy to said fluid medium comprising electrical means to heat said fluid medium, said fluid means comprising a liquid expandable with application of heat, said electrical circuit comprising an automatic control switch, other switch means, connections connecting the automatic control switch shunting said other switch means, and said other switch means including switches for controlling energizing of said electrical circuit and said electrical means if desired when said control switch is open, and friction coupling means operably connecting said control switch to said piston for automatic control thereof including means to close the switch in only one direction of travel of said piston corresponding to said opposite direction and substantially as soon as piston movement begins in said one direction.

References Cited

UNITED STATES PATENTS

| | | | |
|---|---|---|---|
| 2,548,708 | 4/1951 | Dickey | 60—25 |
| 2,803,110 | 8/1957 | Chittenden | 91—275 X |
| 3,131,269 | 4/1964 | Asakawa | 60—23 X |
| 3,166,893 | 1/1965 | Sherwood | 60—23 |
| 3,173,244 | 3/1965 | Schutmaat | 60—23 |
| 3,256,686 | 6/1966 | Lindberg | 60—25 |

CARROLL B. DORITY, JR., *Primary Examiner.*

U.S. Cl. X.R.

91—7, 20, 52, 275